US005890277A

United States Patent [19]
Kliman

[11] Patent Number: 5,890,277
[45] Date of Patent: Apr. 6, 1999

[54] METHOD FOR MANUFACTURING A CLAW POLE STATOR STRUCTURE

[75] Inventor: Gerald B. Kliman, Niskayuna, N.Y.

[73] Assignee: General Electric Company, Schenectady, N.Y.

[21] Appl. No.: 743,066

[22] Filed: Nov. 4, 1996

[51] Int. Cl.$^6$ .................................................... H02K 15/00
[52] U.S. Cl. ............................................................. 29/596
[58] Field of Search ................................. 29/596; 310/42, 310/43, 44, 46, 112, 218, 254, 257, 259

[56] References Cited

U.S. PATENT DOCUMENTS

| | | | |
|---|---|---|---|
| 4,392,072 | 7/1983 | Rosenberry | 310/216 |
| 4,818,911 | 4/1989 | Taguchi et al. | 310/259 |
| 4,891,567 | 1/1990 | Fujitani et al. | |
| 5,276,958 | 1/1994 | Larsen | 29/596 |

*Primary Examiner*—Timothy V. Eley
*Assistant Examiner*—Benjamin M. Halpern
*Attorney, Agent, or Firm*—Ann M. Agosti; Marvin Snyder

[57] ABSTRACT

A multipole brushless DC motor stator is formed with a pair of complementary opposable claw pole stator structures in which each of the stator structures comprises a stator base formed of a plurality of stacked sheet metal laminations. A plurality of stator pole members extend from the stator base and are formed by compression molding of a ferromagnetic material. In one form, the ferromagnetic material is molded in situ on the stator base by positioning the stator base in a compression mold having the slots in which a powdered or flaked ferromagnetic material can be positioned and compressed by a die. In another form, the ferromagnetic pole members may be independently compression molded of powdered or flaked ferromagnetic material and then adhesively bonded to the stacked laminations forming the stator base. In either method, the stacked laminations are formed with a plurality of receptacles for receiving one end of each of the stator poles and holding the stator poles to the stator base.

6 Claims, 4 Drawing Sheets

5,890,277

METHOD FOR MANUFACTURING A CLAW POLE STATOR STRUCTURE

BACKGROUND OF THE INVENTION

The present invention relates to brushless direct current (DC) motors and, more particularly, to a stator structure and method of manufacture of a claw-pole stator structure for such motors.

One form of brushless DC motor includes a stator structure comprising a pair of opposed, complementary, claw-pole stator members with a stator winding formed on a bobbin and sandwiched therebetween. Each of the stator members comprises a planar base component with a plurality of circumferentially spaced stator poles extending in a normal direction from adjacent a periphery of the base component. A central core member extends from at least one of the base components of each pair and passes through a center of the winding bobbin. A permanent magnet rotor circumscribes the stator structure and is radially spaced therefrom by a small air gap.

Prior art methods of manufacture of claw-pole stators include machining the complementary stator pairs from solid blocks of ferromagnetic material, typically a block of molded magnetic material such as a powdered iron in a plastic matrix. While this method produces a structure with good electrical and magnetic characteristics, the cost of manufacture is generally excessive. Another method that is more economically viable is to form the stator structure by stamping a magnetic metal plate and then bending circumferential extensions of the plate to form the depending magnetic poles. In general, such stamped and bent structures have unsatisfactory electrical and magnetic characteristics. Accordingly, it is desirable to provide a claw-pole, brushless DC motor and method of manufacture which is both economical and has good electrical and magnetic characteristics.

SUMMARY OF THE INVENTION

Among the several objects of the present invention may be noted the provision of an improved claw-pole stator structure; the provision of a claw-pole stator structure and method of manufacture which minimizes material costs; the provision of a claw-pole stator structure having good performance characteristics; and the provision of a method of manufacture of claw-pole stator structures which is relatively simple without deterioration of product performance.

In one form, the invention is illustrated as a multiple pole brushless DC motor stator comprising a pair of complementary opposable claw-pole stator structures, each of the stator structures having a stator base and a plurality of stator pole members extending in a generally normal direction from a plane of a stator base. Each stator base comprises a plurality of stacked sheet metal laminations. Each stator pole comprises a unitary member formed by compression molding of a powdered iron in a plastic matrix or a binderless iron flake. Each of the stator poles is attached at preselected locations about the periphery of the stator base. In one form, the pole members are separately formed and adhesively bonded to the stator base. In another embodiment, the stator base is placed in the bottom of a female die and the powdered or flaked ferromagnetic material is poured into the die and then compression molded in situ to form the stator pole members in which the compression molding process bonds the pole members to the stator base.

The stator base may be formed of a plurality of stamped laminations having peripheral slots at locations at which the stator pole members are to be attached. The slots may be formed as mortises in the laminations. A center core member may also be attached to the stator base either by separately forming the center core and adhesively bonding it to the stator base or by forming the center core in situ in the same manner as forming of the pole members.

In a more specific method, the stator base may be formed by stamping each of a plurality of stator laminations from a sheet of magnetic material. The stator laminations are then stacked to a predetermined height to form the stator base. The laminations may be formed in a conventional design having cutouts or protrusions which allow the laminations to be aligned in a predetermined arrangement and to attach one to another. The stator pole members may be preformed in a conventional compression molding operation and subsequently attached to the stator base by adhesively bonding the stator pole members to the stator base. The laminations may be formed with peripheral slots for receiving the stator poles in predetermined orientations. The slots may be cut in the edges of the laminations or be indented from the edges to form mortises for receiving the stator poles. Alternatively, the stacked laminations forming the stator base may be placed in a female die shaped for receiving a powdered or flaked ferromagnetic material which can be molded to form the stator pole members. A male die having a configuration which mates with the female die and forms the stator pole members in the desired final shape is then brought into operative position with the female die so as to compress the ferromagnetic material into the shape of the stator pole members. By compression molding the stator pole members onto the stacked laminations, the pole members are molded in situ and attached to the stator base. The stator base may be formed with peripheral slots at which the stator pole members are attached by the molding process or be formed with mortises in which the stator pole members are compression molded and attached to the stator base.

BRIEF DESCRIPTION OF THE DRAWINGS

For a better understanding of the present invention, reference may be had to the following detailed description taken in conjunction with the accompanying drawings in which.

DETAILED DESCRIPTION OF TM INVENTION

Figure 1:
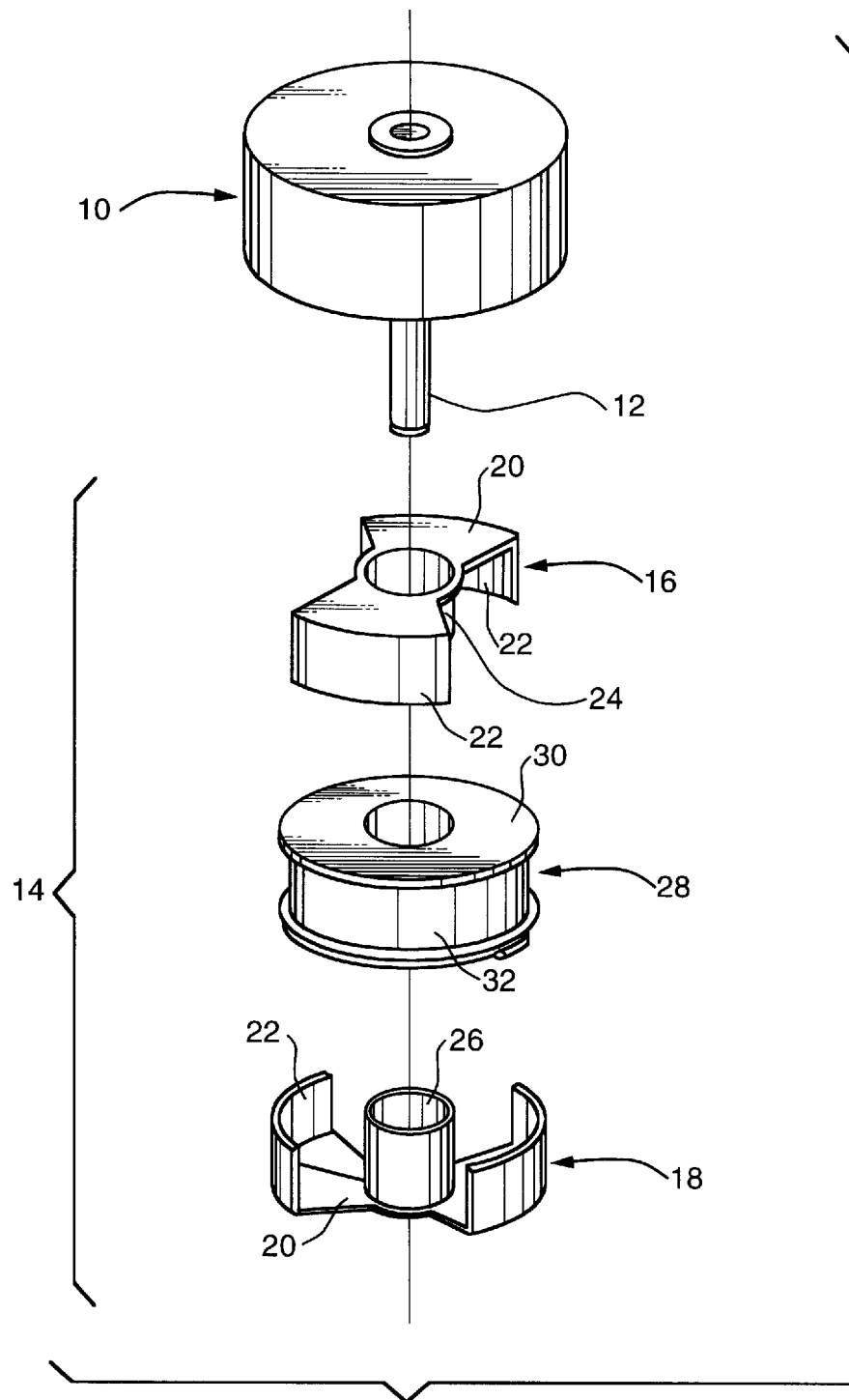
FIG. 1 is an exploded view of a prior art brushless DC motor assembly.

FIG. 1 illustrates the general elements of a brushless DC motor characteristic of the prior art. The DC motor includes an annular rotor 10 which includes an inner annular magnet bonded to an inner surface of a rotary yoke. A shaft 12 is attached to the rotor 10 and extends centrally through a stator assembly 14. The stator assembly 14 includes an upper claw pole shaped stator member 16 and a complementary lower claw pole stator structure 18. Each of the stator members includes a generally flat plate 20 from which depend a pair of opposed pole members 22. The stator members are formed from a stamping or punching from a sheet of ferromagnetic material with the pole members being bent into the illustrated shape. Additionally, a center core 24 depends from the upper stator member while a center core 26 extends from the lower stator member. The center core 26 may be hollow to pass the shaft 12 and also be sized to fit inside of the upper center core member 24. An annular coil 28 is sandwiched between the upper and lower stator members to provide the electromagnetic excitation for the stator. The coil 28 includes a bobbin 30 on which windings 32 are wound in a well known manner.

When assembled, the coil 28 is captured between the upper and lower stator members and the pole members 22 of the upper stator member 16 interleave with the pole members 22 of the lower stator member 18. The rotor 10 fits onto the assembled stator and the permanent magnets in the rotor circumscribe the periphery of the stator formed by the pole members. A more detailed description of this prior art form of motor is given in U.S. Pat. No. 4,891,567.

Figure 2:
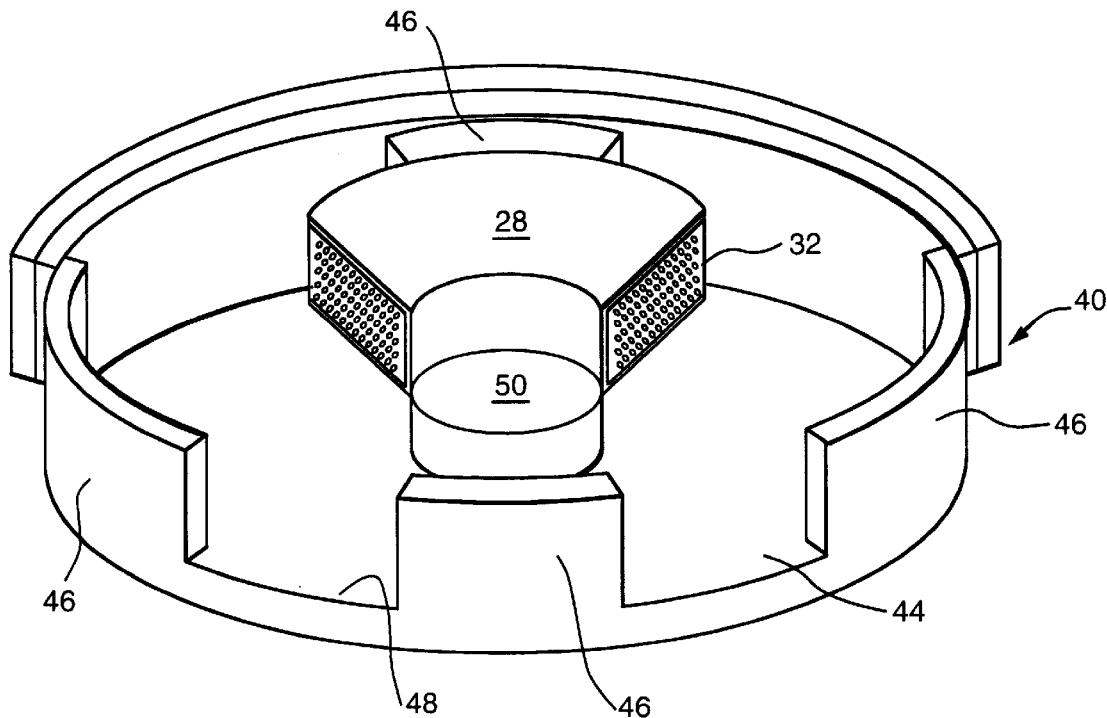
FIG. 2 is a partial cross-sectional view of one-half of a stator core and associated rotor in a fully molded single phase, multi-pole brushless DC motor of the prior art.

Turning now to FIG. 2, there is shown a partial cross-sectional view of an assembled multi-pole brushless DC motor 40 similar to that illustrated in FIG. 1 but in which the stator members 44 are formed from a molded material and include four pole members 46 on each of the upper stator member (not shown) and lower stator member 44. While the upper stator member is not shown in FIG. 2, it will be appreciated to have a substantially complementary shape to the lower stator member 44 of FIG. 2 with the depending pole members from the upper stator member fitting into the spaces between the pole members 46 extending upward from the lower stator member 44. The illustrated stator member 44 may be formed as a unitary structure by molding a solid block of ferromagnetic material and then machining the block to form the bottom plate or stator base 48 and pole members 46 of the stator member 44. Preferably, the stator members are formed by compression molding of binderless flake or powdered iron (ferromagnetic) material with a suitable binder. Typically, a plastic matrix is used as the binder for powdered iron particles. Sources of such ferromagnetic material suitable for forming the stator members include the Hoeganaes Corporation and Magnetics International, Inc.

While it is known to machine the stator core members 42 from molded ferromagnetic material, the cost of producing a molded stator member by this method is not economical since a great deal of molded magnetic material is removed in the machining process. The material cost for the moldable ferromagnetic material is as much as two to three times that of conventional ferromagnetic steel sheets. Accordingly, it is desirable to minimize the volume of the flaked or powdered ferromagnetic material that is used to manufacture such stator assemblies. While it would be desirable to compression mold the stator assembly into its final shape, compression molding of three dimensional structures such as that illustrated by the claw-pole stator member 44 has not been demonstrated. As will be recognized, the different heights of the material in the final product may require different material loading in a die and different press strokes to complete the three dimensional shape. For example, the pole members 46 and center post or core 50 require a different press stroke than the bottom plate 48 of the stator structure. Still further, the compression capability of a molding press for forming the stator structure must be very large since high pressures must be maintained over the entire area of the stator base 48. For example, for a three inch diameter stator structure, proper compression of the ferromagnetic material may require at least a 500 ton press to achieve a 50 ton per square inch compression force. Such a large compression molding press adds to the expense of manufacturing a fully molded stator structure.

Figure 3:
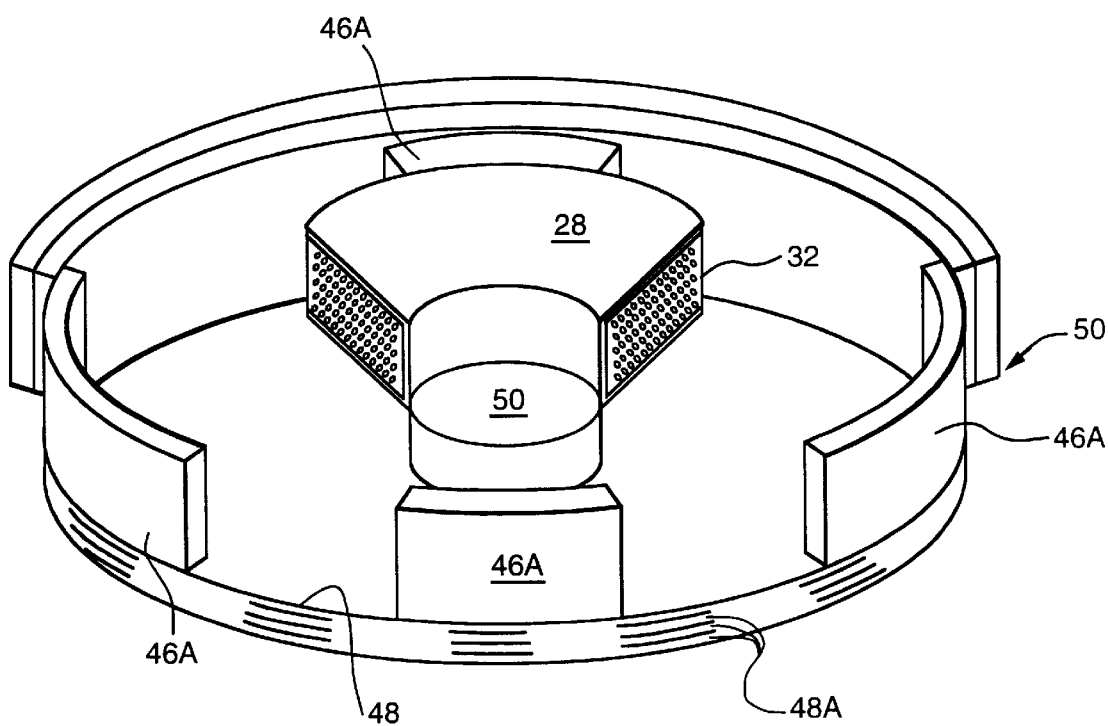
FIG. 3 is a simplified partial cross-sectional view of a half of a stator assembly for a single phase, multi-pole brushless DC motor employing the teaching of the present invention.

Applicant has invented a cost effective way to produce a stator structure such as that shown in FIG. 2 by using a combination of sheet metal laminations and molded parts. Referring now to FIG. 3, there is shown a single phase, multi-pole brushless DC motor structure 50 in which the bottom plate or stator base 48 of the stator structure is formed by a plurality of stacked sheet metal laminations 48A of the type commonly used to create rotors or stators for induction motors. The laminations are produced in a conventional manner by stamping from sheets of ferromagnetic material. Once the laminations have been stamped into the desired form, a predetermined number of laminations are stacked to form the bottom plate or stator base 48. The stator pole members 46A can be separately molded from powdered or sintered ferromagnetic material and then adhesively bonded to the stator base 48 to extend axially from the stator base and to form the half stator structure 50. It will be recognized that the second or upper half of the stator structure is essentially a mirror image of the lower half shown in FIG. 3 with the pole member locations of the upper half stator structure being shifted so as to be complementary with the pole locations of the lower stator structure 50 so that when the upper and lower stator structures are assembled, the pole members are interdigitated.

Figure 4:
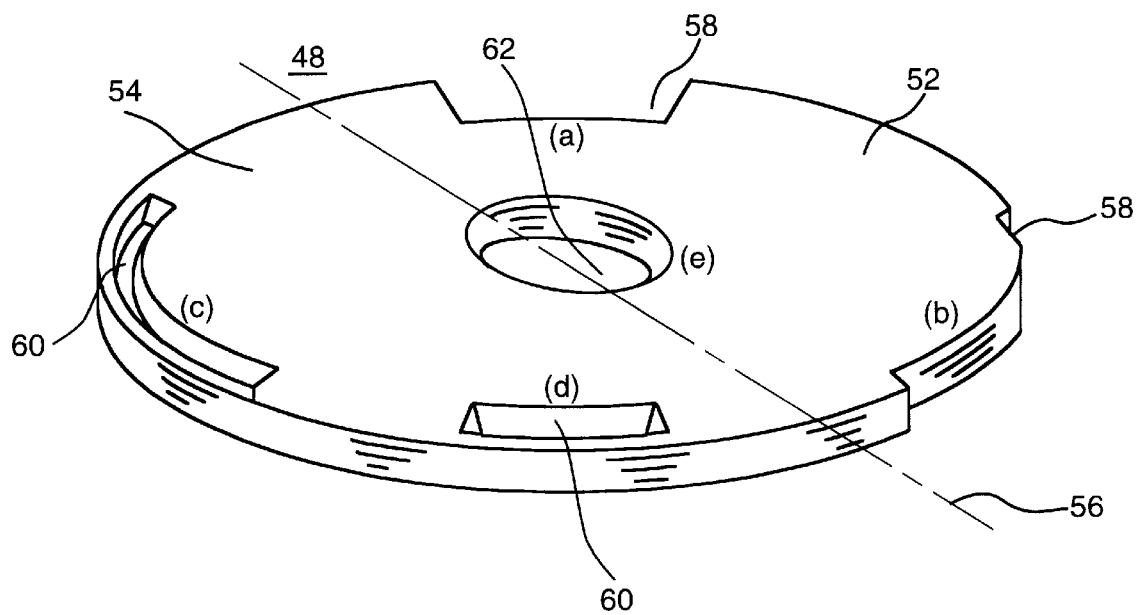
FIG. 4 illustrates a stator base which can be used in the assembly of FIG. 3 and which illustrates two different forms of stator base in a single drawing.

FIG. 4 illustrates two different methods of forming the stator base 48 from stacked laminations as described with regard to FIG. 3. FIG. 4 is a composite drawing of one form of stacked laminations 52 and another form of stacked laminations 54 separated by phantom line 56. In the laminations 52, locations for the pole members 46 are defined by receptacles 58 formed along the outer periphery of the stacked laminations. In the stacked laminations 54, locations for pole members 46 are formed as slotted receptacles or mortises 60 adjacent to but spaced from the outer periphery of the laminations. In both cases, the center core member 50 fits into an opening 62 in the center of the stacked laminations. It will be appreciated that the laminations are each pre-punched and are generally circular shaped with either the inner receptacles 60 or the outer peripheral receptacles 58 punched at the time the laminations are formed. In a well known manner, the laminations may include alignment guides (not shown) which enable the laminations to be properly stacked so that the receptacles 58 or 60 align with each other. If the receptacles 58 along the outer periphery of the laminations are used to support the pole members 46, it may be desirable to adhesively bond the pole members to the laminations. If the receptacles are formed as slots 60 within the lamination structure, it may be possible to mold the pole members 46A in situ since such molding will tightly bind at least a portion of the molded poles into the receptacles. In effect, the receptacles 60 act as mortises with the ends of the pole members 46A being molded as tenons inserted into the mortises.

If the pole members 46A are molded as separate parts, a large number of identical pole members can be made on a relatively small tonnage press such as a ten ton press. Such a press can also be utilized to mold the center post or core 50 for the stator structure 50. The pre-molded stator pole members 46A may be inserted into the outer receptacles 58 or the formed mortises 60 in the stacked laminations and adhesively bonded to the laminations. Alternatively, when the receptacles 60 are formed as mortises for attaching the stator pole members 46A, the molded pole members may be secured by force fitting into the mortises. While the mortises 60 may be small slots whose function is simply to hold the molded parts in place, it is preferable that they should be approximately the same size as the pole members 46A in order to achieve the most effective transfer of flux from the laminated plate 48 into the pole members 46A. Furthermore, it is also more mechanically secure to use a larger receptacle. Still further, if the magnetic pole members 46A can be molded with a uniform cross-section so that one end fits into the mortise shaped receptacles 60, the pole members will be easier to mold without the concerns expressed above with regard to three dimensional parts.

Figure 6:
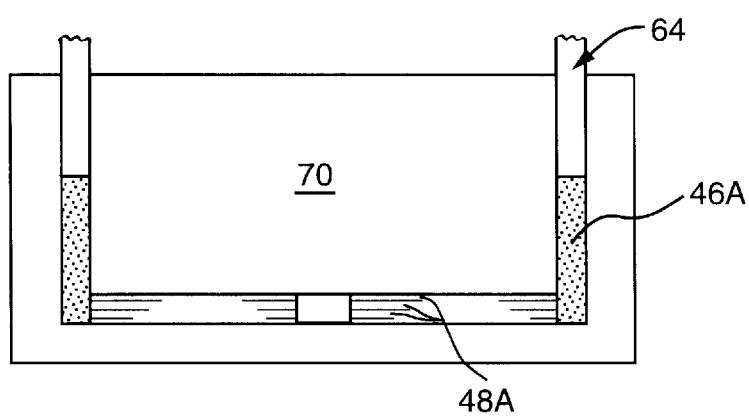
FIG. 6 illustrates the compression molding process of forming the inventive claw pole stator structure using the male and female die components of FIGS. 5A and 5B.

If the stator pole members 46A are molded in situ to the stator base 48, the manufacturing steps can be reduced by eliminating the need to adhesively bond the stator pole members to the stator base. In this process, the stator lamninations are attached by conventional methods into relatively rigid stacks of a predetermined number of such laminations. The stacked laminations forming the stator base 48 are then placed in a molding die in which the stator pole members and center core may be molded in situ. Referring now to FIGS. SA and SB, there is shown one form of a male die 64 and a female die 66 which may be used to form the stator pole members 46A in situ on the stator base 48. Note that the female die 66 has an outer casing 68 and an inner member 70 which form an annular groove 72 therebetween. The inner member 70 is removable from and separately positionable within the female die 66 by means well known in the art. The male die 64 includes an end ring 74 from which depend a plurality of protrusions 76, each of the end ring 74 and the protrusions 76 fitting into the slot or groove 72 defined between the outer casing 68 and inner member 70 of the female die 66. FIG. 6 is a simplified cross-sectional view illustrating positioning of the male and female dies 64, 66 for forming the stator structure 50. The stator laminations 48A are placed in the lower portion of the female die 66 with the center member 70 positioned over the laminations and held in place by conventional means. The groove or slot 72 defined between the inner member 70 and outer casing 68 of the female die may then be filled with a predetermined amount of flaked or powdered ferromagnetic material. As the male die 64 is brought down into engagement with the female die, the ferromagnetic material, which acts as a fluid, flows out from under the die tooth protrusions 76 which form the pole spaces and fills up the main pole space between the protrusions to form the pole members 46A. As the ferromagnetic material is compressed to form the pole members, the material flows into the prepared receptacles or mortises 60 in the laminations in order to lock the pole members into place as they are formed. The advantage of this arrangement is that the physical size of the die need only be as large as the stator and only the area of the pole members 46A and center core 50 need be pressed so that the tonnage of the press will be modest such as, for example, 50 tons, and the stroke can be identical for all of the sections to be formed. The preformed recesses 58 or mortises 60 in the laminations may also serve to align the laminated stator base 48 with the mating die sections.

Figure 5A:
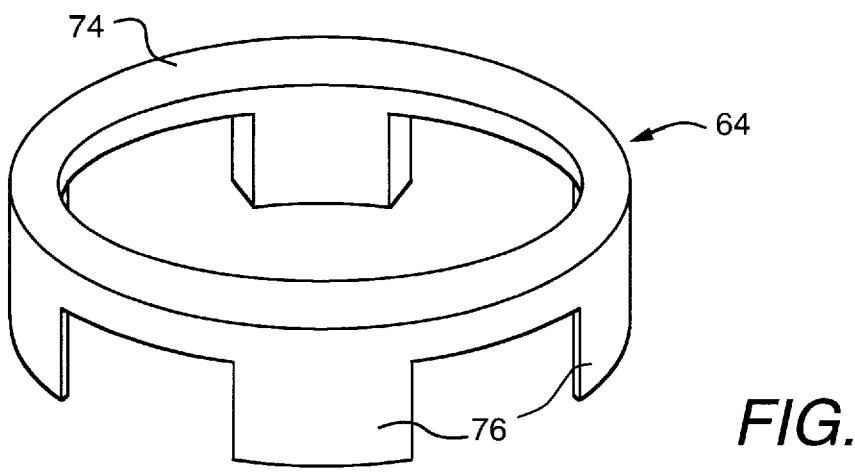
FIGS. 5A and 5B illustrate male and female die components which can be utilized to form the claw pole stator assembly of FIG. 3.
Figure 5B:
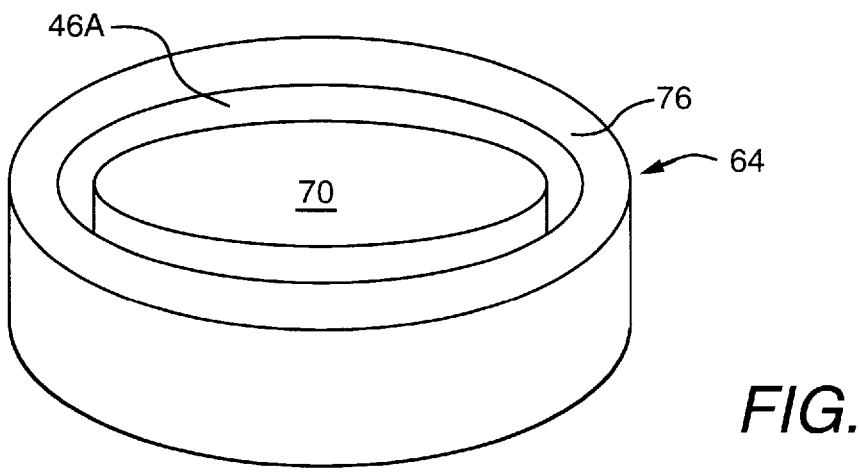

While the center core 50 is not shown in FIGS. 5 and 6, it will be recognized that the male die 64 and the center member 70 of the female die 66 can be designed to provide an opening and a protrusion for molding the center core concurrently with the pole members 46A. Alternately, the center core 50 could be separately molded and adhesively bonded to the stator base 48. It will be recognized that various forms of dies can be used to create the composite stator structure 44 and that the dies shown in FIGS. 5 and 6 are provided only by way of example. Note also that the iron or ferromagnetic material to be molded must be precisely measured into the cavity so that the pole members 46A formed by compression of the ferromagnetic material will be the exact size of the spaces formed in the male die.

While it is anticipated that the ferromagnetic material will flow away from the protrusions 76 in the male die 64 illustrated in FIG. 5A, a different type of die may be used to assure that no ferromagnetic material is trapped between the die tooth protrusions 76 and the stator laminations 48.

Figure 7:
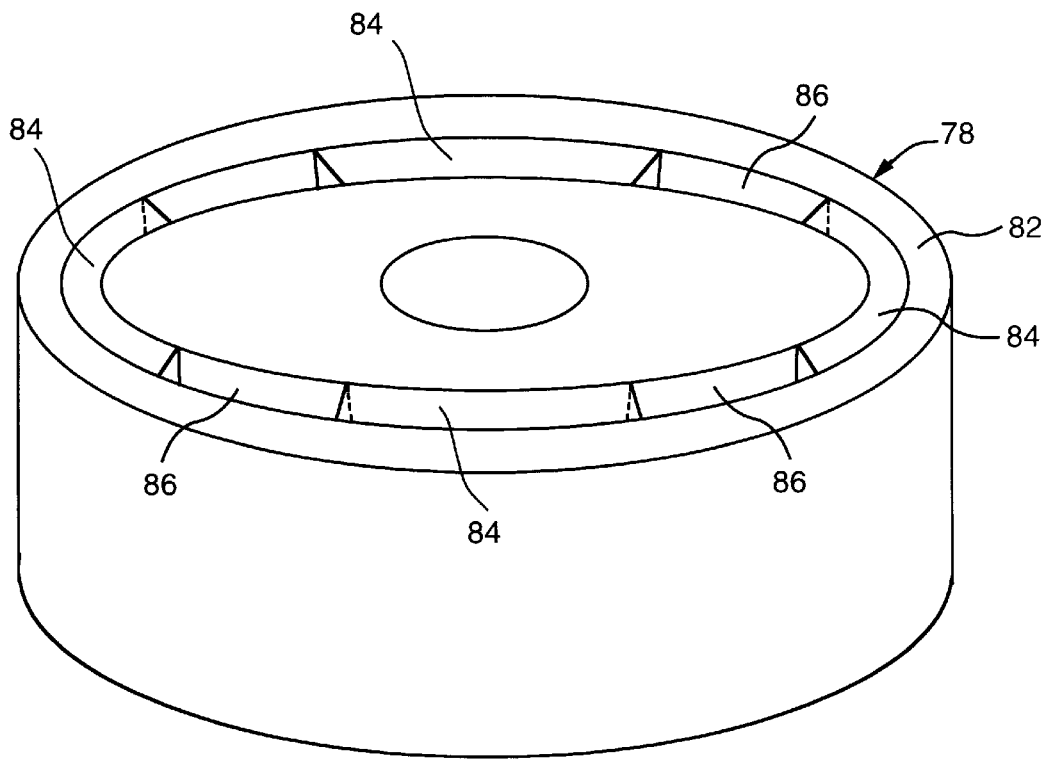
FIG. 7 illustrates an alternate female die for use in forming the claw pole stator structure of FIG. 3.

Referring now to FIG. 7, there is shown an alternate embodiment of a female die 78 which may be used to compression mold the stator pole members 46 and center core 50 in situ on the stator base 48. In the embodiment of FIG. 7, the female die 78 incorporates an integral center member 80 connected to an outer casing 82 by means of die segments 84 which fill the pole space between each of the pole members 46A. In using this female die section, once the stator base 48 has been positioned in the female die 78, the spaces 86 between the segments 84 connecting the inner die member 80 to the outer casing 82 are then filled with a precisely measured amount of the ferromagnetic powdered material. A male die (not shown) similar to that shown in FIG. 5A is then brought down into engagement with the female die 78 to compress the ferromagnetic powder and create the compression molded pole members 46A and core 50 in situ on base 48.

While it is anticipated that the pole members 46A will bond to the stator base 48 by compression molding of at least a portion of the ends of the pole members into the receptacles 60 formed in the stator base, an alternate method to assure a secure bond is to provide a staggered alignment of the individual laminations as the laminations are stacked to form the stator base. If the laminations are very slightly misaligned, the receptacles 60 which receive the powdered iron material will have artificially roughened edges caused by the misalignment between the laminations. These edges will provide a bonding surface for the compressed and molded pole members to attach to the stator laminations. In one embodiment, the hole punching die is offset in punching some holes in the stator laminations, and the laminations are then rotated to stagger the laminations and form an artificially roughened hole through the lamination stack.

While the invention has been described in what is presently considered to be a preferred embodiment, various modifications and improvements will become apparent to those skilled in the art. It is intended therefore that the invention not be limited to the specific disclosed embodiment but be interpreted within the full spirit and scope of the appended claims.

What is claimed is:

1. A method for manufacture of a multi-pole stator for a brushless direct current (DC) motor, the stator including a stator winding assembly positioned about a center core member and a pair of complementary claw-pole stator structures, each of said stator structures being formed by the steps of:

forming a plurality of stator laminations by stamping individual laminations from a sheet of magnetic material:

stacking a predetermined number of the stator laminations to form a stator base;

positioning the stator base in a female die;

placing a predetermined volume of loose powdered or flaked iron material in the female die;

compressing the iron material with a male die having a configuration for molding a plurality stator poles from the iron material whereby the stator poles are formed in situ on the stator base and extend axially from the stator base; and removing the completed stator structure from the female die.

2. The method of claim 1 wherein the step of forming the laminations includes the step of punching receptacles in the laminations for receiving the stator poles, the step of compressing including the step of aligning the stator base to form the stator poles with an end thereof in the receptacles.

3. A method for manufacture of a multi-pole stator for a brushless direct current (DC) motor, the stator including a stator winding assembly positioned about a center core member and a pair of complementary claw-pole stator structures, each of said stator structures being formed by the steps of:

forming a plurality of stator laminations by stamping individual laminations from a sheet of magnetic material;

stacking a predetermined number of the stator laminations to form a stator base;

positioning the stacked laminations in a female die having a configuration for forming the stator poles;

filling the female die with powdered or flaked iron material; and compressing the iron material onto the stacked laminations for molding a plurality of stator poles in situ on the laminations extending axially from the stator base.

4. The method of claim 3 wherein the step of forming the laminations includes the step of punching receptacles in the laminations for receiving the stator poles, the step of compressing including the step of aligning the stator base to form the stator poles with an end thereof in the receptacles.

5. A method for manufacture of a multi-pole stator for a brushless direct current (DC) motor, the stator including a stator winding assembly positioned about a center core member and a pair of complementary claw-pole stator structures, the method comprising:

forming each of said stator structures by:

forming a plurality of stator laminations by stamping individual laminations from a sheet of magnetic material and punching a center core receptacle in each of the stator laminations stacking a predetermined number of the stator laminations to form a stator base, molding a plurality of stator poles from a moldable ferromagnetic material, and attaching the stator poles to the stator base, the stator poles extending axially from the stator base; and attaching a center core to at least one stator base by compression molding the center core in situ in the receptacle.

6. The method of claim 4 wherein the step of aligning includes the step of offsetting at least some of the laminations of the stator base whereby at least two edges of the receptacles are formed with a gripping surface.

* * * * *